United States Patent
Miyazaki et al.

(10) Patent No.: US 9,298,739 B2
(45) Date of Patent: Mar. 29, 2016

(54) POSITION INFORMATION PROVIDING APPARATUS, POSITION INFORMATION PROVIDING SYSTEM, POSITION INFORMATION PROVIDING METHOD, PROGRAM, AND RECORDING MEDIUM

(75) Inventors: Yoji Miyazaki, Tokyo (JP); Yuki Chiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 352 days.

(21) Appl. No.: 13/988,460

(22) PCT Filed: Nov. 23, 2011

(86) PCT No.: PCT/JP2011/076969
§ 371 (c)(1),
(2), (4) Date: Jul. 30, 2013

(87) PCT Pub. No.: WO2012/070595
PCT Pub. Date: May 31, 2012

(65) Prior Publication Data
US 2013/0304736 A1    Nov. 14, 2013

(30) Foreign Application Priority Data
Nov. 23, 2010  (JP) ................. 2010-260725

(51) Int. Cl.
*G01C 21/10* (2006.01)
*G06F 17/30* (2006.01)
*G01C 21/20* (2006.01)

(52) U.S. Cl.
CPC .......... *G06F 17/30241* (2013.01); *G01C 21/20* (2013.01)

(58) Field of Classification Search
CPC .................. G06F 17/30241; G01C 21/20
USPC ............................. 701/500; 707/736
See application file for complete search history.

(56) References Cited

U.S. PATENT DOCUMENTS

| | | | |
|---|---|---|---|
| 2002/0065603 A1 | 5/2002 | Watanabe et al. | |
| 2010/0257195 A1 | 10/2010 | Inoue et al. | |
| 2011/0004404 A1* | 1/2011 | Morgan et al. | 701/220 |
| 2011/0242319 A1 | 10/2011 | Miyajima | |

FOREIGN PATENT DOCUMENTS

| | | |
|---|---|---|
| JP | 4-213019 A | 8/1992 |
| JP | H04-258714 A | 9/1992 |
| JP | H05-080697 A | 4/1993 |
| JP | H07-248230 A | 9/1995 |
| JP | H08-334344 A | 12/1996 |

(Continued)

OTHER PUBLICATIONS

International Search Report of PCT Application No. PCT/JP2011/076969 mailed on Mar. 6, 2012.

(Continued)

*Primary Examiner* — Luke Huynh

(57) ABSTRACT

A position information providing apparatus includes a sensor data acquiring unit acquiring sensor data, a feature amount calculating unit calculating a feature amount from the sensor data, and a confidence level calculating unit calculating a confidence level using the feature amount, wherein the sensor data is more than one, and the feature amount includes a statistical amount of more than one piece of the sensor data and an amount showing a form of the sensor data.

12 Claims, 14 Drawing Sheets

(56) References Cited

FOREIGN PATENT DOCUMENTS

| | | | |
|---|---|---|---|
| JP | H09-257924 | A | 10/1997 |
| JP | 2000-105898 | A | 4/2000 |
| JP | 2002-168638 | A | 6/2002 |
| JP | 2004-212162 | A | 7/2004 |
| JP | 2005-91071 | A | 4/2005 |
| JP | 2009-229295 | A | 10/2009 |
| JP | 2009229295 | A * | 10/2009 |
| JP | 2010-101810 | A | 5/2010 |
| JP | 2010-256943 | A | 11/2010 |
| JP | 2011-227037 | A | 11/2011 |
| JP | 2011-232271 | A | 11/2011 |
| WO | 2010/095426 | A1 | 8/2010 |

OTHER PUBLICATIONS

Japanese Office Action for JP Application No. 2012-545776 mailed on Nov. 4, 2015 with English Translation.

* cited by examiner

Scope of search 210

Radius = 10 + 20 × (1.0 − confidence level)
Angle = 360 − 270 × (confidence level)

Scope of search 220

Radius = 10.8
Angle = 100.3

| Acceleration | | Angular speed | | Feature amount 600 |
|---|---|---|---|---|
| Variance | 8000 | Average value | 100 | |
| Number of peaks | 10 | Maximum value | 500 | |
| Average interval of peak | 100 | | | |

Confidence level 610

Confidence level relating to acceleration
Confidence level (variance) = 1.0                              variance ≤ 9000
             = exp (0.001 × (9000 − variance))                 variance > 9000
Confidence level (number of peaks) = 1.0                       number of peaks ≤ 10
             = exp (0.001 × (10 − number of peaks))            number of peaks > 10
Confidence level (average interval of peak)
             = exp (−0.001 × (average interval of peak − 90)^2)

Confidence level 620

Confidence level relating to angular speed
Confidence level (average value)
             = exp (−0.001 × (average value − 90)^2)
Confidence level (number of peaks) = 1.0                       maximum value ≤ 500
             = exp (0.001 × (500 − maximum value))             maximum value > 500

Confidence level 630

Confidence level = average (confidence level (X))

X = (acceleration) variance, number of peaks, average interval of peak,
    (angular speed) average value, maximum value

FIG. 6

| Action | Sensor data |
|---|---|
| Stop | Data A |
| Walk | Data B |
| Run | Data C |
| ... | ... |

Display on AR

Display using map

POSITION INFORMATION PROVIDING APPARATUS, POSITION INFORMATION PROVIDING SYSTEM, POSITION INFORMATION PROVIDING METHOD, PROGRAM, AND RECORDING MEDIUM

This application is a National Stage Entry of PCT/JP2011/076969 filed Nov. 23, 2011, which claims priority from Japanese Patent Application 2010-260725 filed Nov. 23, 2010, the contents of all of which are incorporated herein by reference, in their entirety.

TECHNICAL FIELD

The present invention relates to a position information providing apparatus, a position information providing system, a position information providing method, a program, and a recording medium.

BACKGROUND ART

Position information services such as navigation and an information search service are provided, for example, using Augmented Reality (AR) on a portable terminal equipped with a camera, a Global Positioning System (GPS), an acceleration sensor, an electronic compass, and the like. Displaying an actual landscape, shoot by a camera, with various pieces of information superimposed thereon by the AR makes it possible to provide easy-to-understand navigation and easy-to-understand information search services. For example, by displaying multiple pieces of information such as merchandises and menus of surrounding shops in a downtown in a superimposed manner, the conditions of the surrounding shops can easily be grasped and a favorite shop can be searched at once.

However, it was difficult to use the AR on a portable terminal inside of a building. Further, even at the outside of a building, it was difficult to use the AR on a portable terminal at a canyon of high-rise building and the like. This is because, at the aforementioned sites such as the inside of a building, the positioning by the GPS cannot be performed or is very difficult and the accuracy of an electronic compass is greatly decreased. Hence, techniques for measuring the position and the direction by autonomous navigation have been developed. The autonomous navigation is a technique for estimating the movement of a user by combining plural sensors such as an acceleration sensor, a gyro sensor, and a magnetic sensor and calculating the position and the moving direction (azimuth) from a reference position. For example, this technique makes it possible to calculate the relative position and the azimuth from a reference position (for example, entrance of shop or the like) even at sites (for example, inside of a building, a canyon of high-rise building, and the like) where the acquisition of the position and the azimuth is difficult by methods such as the GPS and the electronic compass and to enable an AR service.

However, since the autonomous navigation calculates the current position and the current azimuth by adding the measurement values of the changes of the position and the moving direction from a reference position (start of measurement), there is a possibility that measurement errors are also added (accumulated) together with measurement values and measurement errors are increased. As a result, in the case where associated information is presented based on the calculated current position and azimuth, there is a possibility that information not matching an actual current position or an actual current azimuth is presented and a user is got confused.

In order to solve the aforementioned problem in the autonomous navigation, the following method has been employed. That is, the position and the azimuth are calculated by several measurement methods and the measurement result is selected depending on the confidence levels of the calculation results. For example, in Patent Document 1, the reliability of the GPS positioning result is compared with the reliability of the autonomous navigation positioning result, and the positioning result of higher reliability is employed. As the index indicating the reliability of the GPS positioning result, the average value of HDOP information and SN information contained in GPS data is used. The index indicating the reliability of the autonomous navigation positioning result is calculated from the cumulative travel distance and the cumulative amount of direction change.

RELATED ART DOCUMENT

Patent Document

[Patent Document 1] JP 2009-229295 A

SUMMARY OF INVENTION

Problem to be Solved by the Invention

In Patent Document 1, the confidence level is calculated using the positioning results such as the cumulative travel distance and the cumulative amount of direction change. Note here that a great cumulative travel distance or a great cumulative amount of direction change does not always show poor reliability of the positioning result. Even in the case of a great travel distance and a great amount of direction change, it is possible to calculate the position and the direction with high accuracy if noise is little and the value is close to an input value of the sensor data preliminarily expected at the designing stage. In other words, there is a problem that the confidence level cannot be calculated correctly simply by using the positioning results such as the cumulative travel distance and the cumulative amount of direction change.

Hence, the present invention is intended to provide a position information providing apparatus, a position information providing system, a position information providing method, a program, and a recording medium that allow the calculation of the confidence level of the measurement result with high accuracy.

Means for Solving Problem

In order to achieve the aforementioned object, the position information providing apparatus of the present invention includes:
a sensor data acquiring unit acquiring sensor data;
a feature amount calculating unit calculating a feature amount from the sensor data; and
a confidence level calculating unit calculating a confidence level using the feature amount,
wherein
the sensor data is more than one, and
the feature amount includes a statistical amount of more than one piece of the sensor data and an amount showing a form of the sensor data.

The first position information providing system of the present invention includes:
the position information providing apparatus according to the present invention; and a server, wherein
the server is recorded with the sensor data, and
the sensor data acquiring unit acquires the sensor data from the server.

The second position information providing system of the present invention includes:
the position information providing apparatus according to the present invention; and
a server, wherein
the server is recorded with guidance information generation data,
the position information providing apparatus further includes:
a position measuring unit measuring a position and a posture of the position information providing apparatus by autonomous navigation using the sensor data;
a guidance information generating unit generating guidance information to be presented to a user by setting a scope of search in a space around the position information providing apparatus using the position, the posture, and the confidence level and by searching geographical information within the scope of search;
an information presentation unit presenting the guidance information to a user; and
a guidance information generation data acquiring unit acquiring the guidance information generation data from the server, and
the guidance information generating unit further generates the guidance information using the guidance information generation data.

The position information providing method of the present invention uses the position information providing apparatus according to the present invention and includes:
a sensor data acquiring step of acquiring sensor data by the sensor data acquiring unit;
a feature amount calculating step of calculating a feature amount from the sensor data by the feature amount calculating unit; and
a confidence level calculating step of calculating a confidence level using the feature amount by the confidence level calculating unit, wherein
the sensor data is more than one, and
the feature amount includes a statistical amount of more than one piece of the sensor data and an amount showing a form of the sensor data.

The present invention provides a program, wherein a computer is caused to execute the position information presentation method according to the present invention.

The present invention provides a recording medium being recorded with the program according to the present invention and being readable by a computer Effects of the Invention The position information providing apparatus, the position information providing system, the position information providing method, the program, and the recording medium of the present invention allow the calculation of the confidence level of the measurement result with high accuracy.

BRIEF DESCRIPTION OF DRAWINGS

FIG. 6 is a view for showing a specific example of the calculation method of the confidence level in the first exemplary embodiment.

DESCRIPTION OF EXEMPLARY EMBODIMENT

Hereinafter, the present invention will be described with examples. However, the present invention is not limited to the following examples.

Exemplary Embodiment 1

First, the first exemplary embodiment of the present invention will be described.

Figure 1:
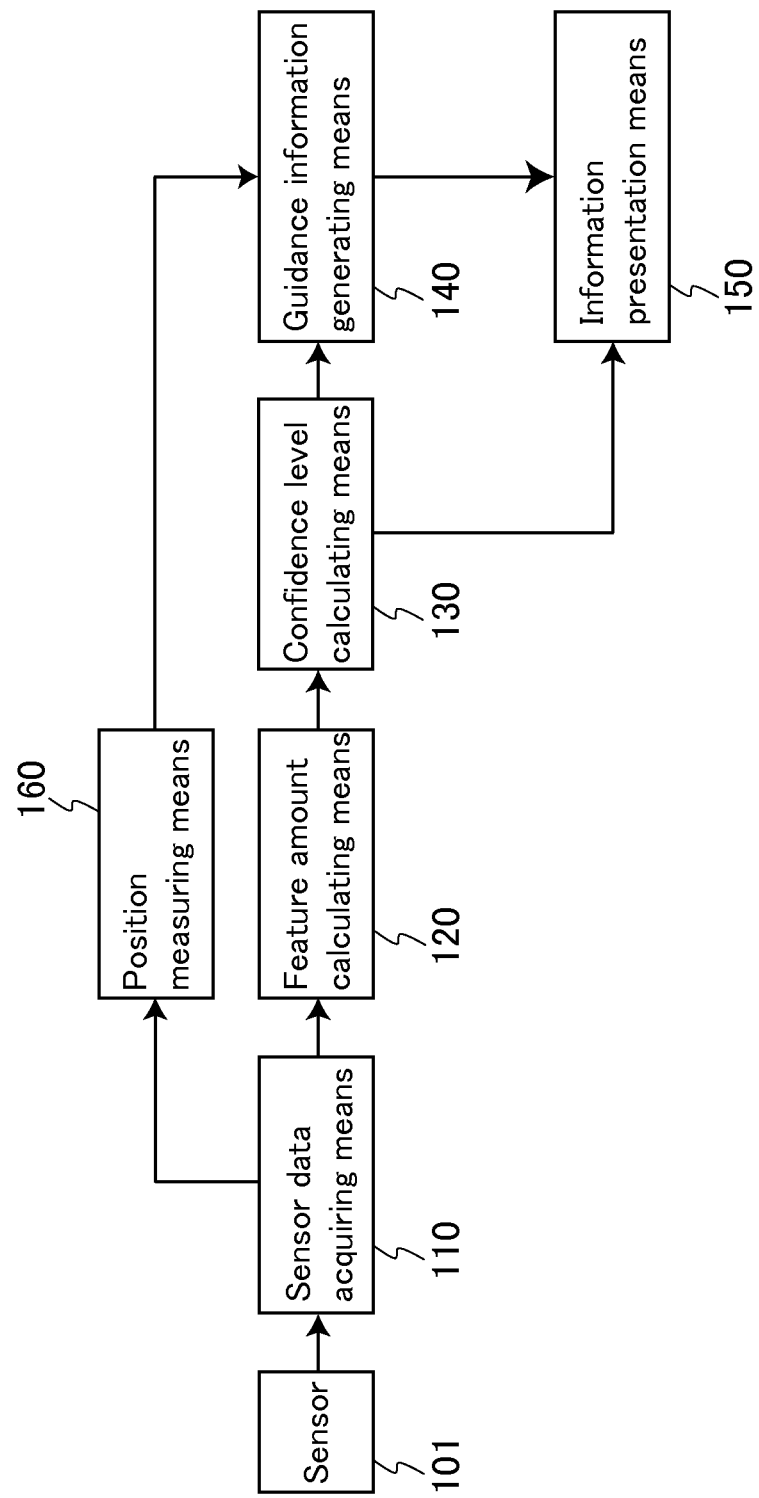
FIG. 1 is a block diagram schematically illustrating the configuration of the position information providing apparatus in the first exemplary embodiment of the present invention.

FIG. 1 is a block diagram schematically showing an example of the position information providing apparatus of the first exemplary embodiment. As shown in FIG. 1, the position information providing apparatus includes a sensor 101, sensor data acquiring means (unit) 110, feature amount calculating means (unit) 120, confidence level calculating means (unit) 130, position measuring means (unit) 160, guidance information generating means (unit) 140, and information presentation means (unit) 150.

The position information providing apparatus of the present invention preferably is a terminal that can be carried around by a user outdoors (for example, downtown and the like) or indoors or an apparatus incorporated in the terminal of this type, although there is no particular limitation on the position information providing apparatus of the present invention. Examples of the terminal include portable terminals such as game machines, cellular phones, and smartphones; portable personal computers such as notebook computers; and small terminals incorporated in accessories such as key chains, wristwatches, and pendants together with microcomputers. The position information providing apparatus of the present invention is particularly useful at sites (for example, inside of a building, canyon of high-rise building, and the like) where the acquisition of the position and the azimuth is difficult by methods such as the GPS and the electronic compass. However, the position information providing apparatus of the present invention is not limited thereto, and the position information providing apparatus of the present invention can be used anywhere and can be applied to both indoor use and outdoor use.

For example, the terminal may be a terminal capable of acquiring information by connecting to a LAN, the Internet, and the like through a cellular phone network, a wireless LAN, and the like. Further, the terminal may be provided with an information display such as a display and intention presentation apparatuses such as a keyboard and a button, for example, and may implement software for operating the apparatuses.

The sensor 101 may be installed in the inside of the terminal or attached to the outside of the terminal. Further, the sensor 101 may be connected to the sensor data acquiring means 110 by wire or wireless. The position information providing apparatus of the present invention may be an apparatus including a sensor or an apparatus not including a sensor and used with a separately provided sensor.

In FIG. 1, although the means except for the sensor 101 are preferably incorporated in the same terminal, the same computer, and the like, the respective means may individually be on separate portable terminals, separate computers, and the like and may be connected through a network.

In the first exemplary embodiment, there is no particular limitation on the physical configuration of each means forming the apparatus of FIG. 1, and any configuration will do.

Hereinafter, the respective components of the apparatus of FIG. 1 and the actions and functions thereof will be described in detail.

In the apparatus of FIG. 1, for example, during apparatus startup, by acquiring sensor data continuously and using the acquired sensor data, position measurement, confidence level calculation, guidance information generation, and information presentation can be performed. For example, the aforementioned processes may be performed by acquiring sensor data every other second. Hereinafter, mainly, single position measurement, single confidence level calculation, single guidance information generation, and single information presentation will be described. However, the number, the timing, and the like of these processes are not limited by the description below.

The sensor 101 is installed in the inside of or attached to the outside of a portable terminal possessed by a user and generates sensor data based on the position and the posture of the position information providing apparatus of FIG. 1. The portable terminal is preferably the apparatus of FIG. 1 or a terminal equipped with the apparatus of FIG. 1. The sensor data acquiring means 110 sequentially acquires sensor data from the sensor 101 and stores the sensor data in a buffer (not shown) using a storage medium such as a memory, a hard disk, or the like. The position measuring means 160 measures the position and the posture of the terminal by autonomous navigation using the sensor data acquired by the sensor data acquiring means 110. The autonomous navigation may be conventionally known autonomous navigation, and for example, may be the autonomous navigation described in Patent Document 1 and the like. Thereby, for example, the relative position and the posture from a specific point such as an entrance of a building or the like can be measured. Note here that there is no particular limitation on the sensor 101 and examples of the sensor 101 include an acceleration sensor, a gyro sensor, and an electronic compass.

Figure 4:
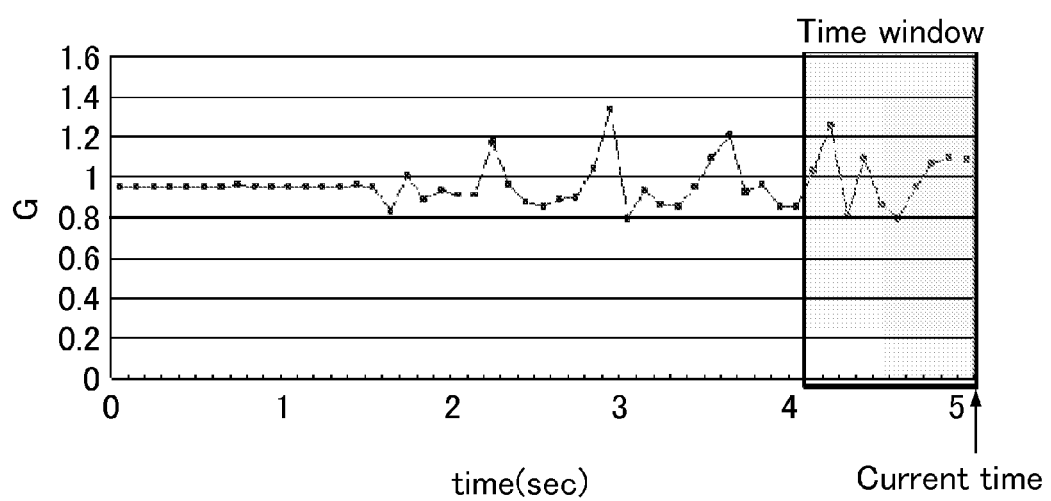
FIG. 4 is a graph for explaining an example of sensor data.

The feature amount calculating means 120 applies statistical processing to the sensor data acquired by the sensor data acquiring means 110 and generates (calculates) the feature amount for calculating the confidence level. For example, in the case where the sensor 101 connected to the sensor data acquiring means 110 is a gyro sensor, an acceleration sensor, an electronic compass, or the like, as shown in FIG. 4, by setting a time window for a past fixed period of time, statistical amounts such as the variance, the average value, the maximum value, the minimum value, and the median value of the sensor data (angular speed, acceleration, azimuth, and the like) within the time window may be calculated or feature amounts showing the features of waveform such as the number of peaks and the average interval of peak within the time window may be calculated. Here, in the graph of FIG. 4, the horizontal axis indicates the elapsed time from a reference time and the vertical axis indicates the value of the sensor data (for example, angular speed, acceleration, azimuth, and the like).

The confidence level calculating means 130 calculates the confidence level of the position and the posture measured by the position measuring means 160 using the feature amount generated (calculated) by the feature amount calculating means 120. For example, in the case where the feature amount exceeding a predetermined range is generated, the confidence level of the position and the posture measured by the position measuring means 160 using the sensor data of the same period is set low. More specifically, for example, in the case where the maximum value or the minimum value of the sensor data exceeds a predetermined range or the variance of the sensor data exceeds a certain value, the confidence level is set low.

Figures 2A, 2B:
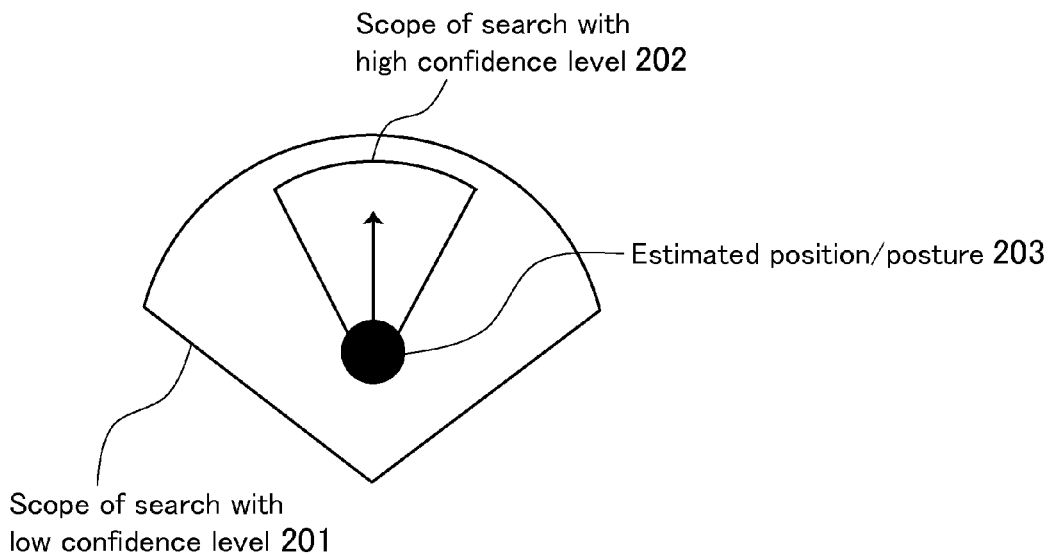
FIGS. 2A and 2B are views for explaining an example of the geographical information search and the guidance information generation in the present invention.

The guidance information generating means 140 generates guidance information to be presented to a user based on the position and the posture measured by the position measuring means 160 and the confidence level calculated by the confidence level calculating means 130. For example, in the case of indoor shop information guidance and indoor tourist information guidance, information of shops (shop name, category, and the like) in an adjacent area of the measured position (position where the position information providing apparatus is estimated to be present) may be acquired by searching from a database. On this occasion, for example, as shown in FIG. 2A, the information of shops may be searched by setting the scope of search at an area 202 closer to the measured position (estimated position/posture 203) in the case where the confidence level is high and the information of shops may be searched by setting the scope of search at a wider area 201 in the case where the confidence level is low. The database may be contained in the inside of the position information providing apparatus of FIG. 1 or may be contained in the inside of a server on the Internet, for example. Further, information to be searched is not limited to information of shops and may be other geographical information (or geospatial information). As described above, the second position information providing system of the present invention includes a server recorded with the guidance information generation data and the position information providing apparatus of the present invention, and the guidance information generating means generates the guidance information using the guidance information generation data.

Figure 3A:
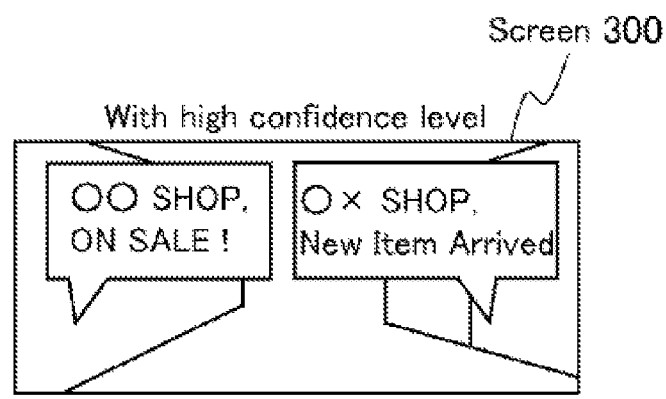
FIGS. 3A and 3B are views for schematically showing examples of the information presentation method used in the present invention.
Figure 3B:
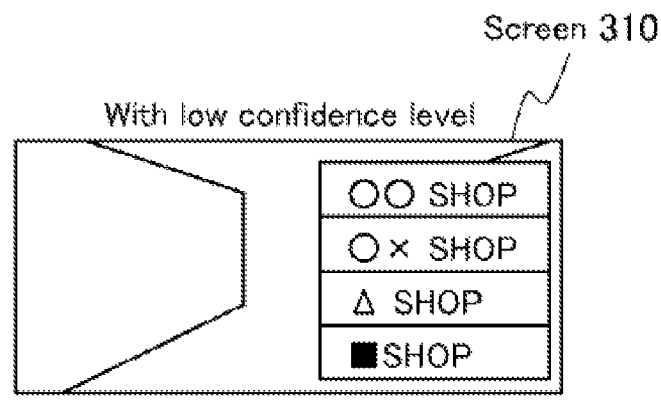

The information presentation means 150 presents the guidance information generated by the guidance information generating means 140 on a terminal using the confidence level calculated by the confidence level calculating means 130. For example, in the case where guidance information is presented using the AR technology, as shown in FIG. 3A, guidance information may be presented on the video images of the respective shops in the case where the confidence level is high. On the other hand, in the case where the confidence level is low, as shown in FIG. 3B, a list of shops may be presented for showing what kind of shops are in surroundings, without presenting further information.

Next, an example of the operation of the position information providing apparatus of FIG. 1 (position information providing method) will be described with respect to each step with reference to FIG. 1 and the flowchart of FIG. 5.

Figure 5:
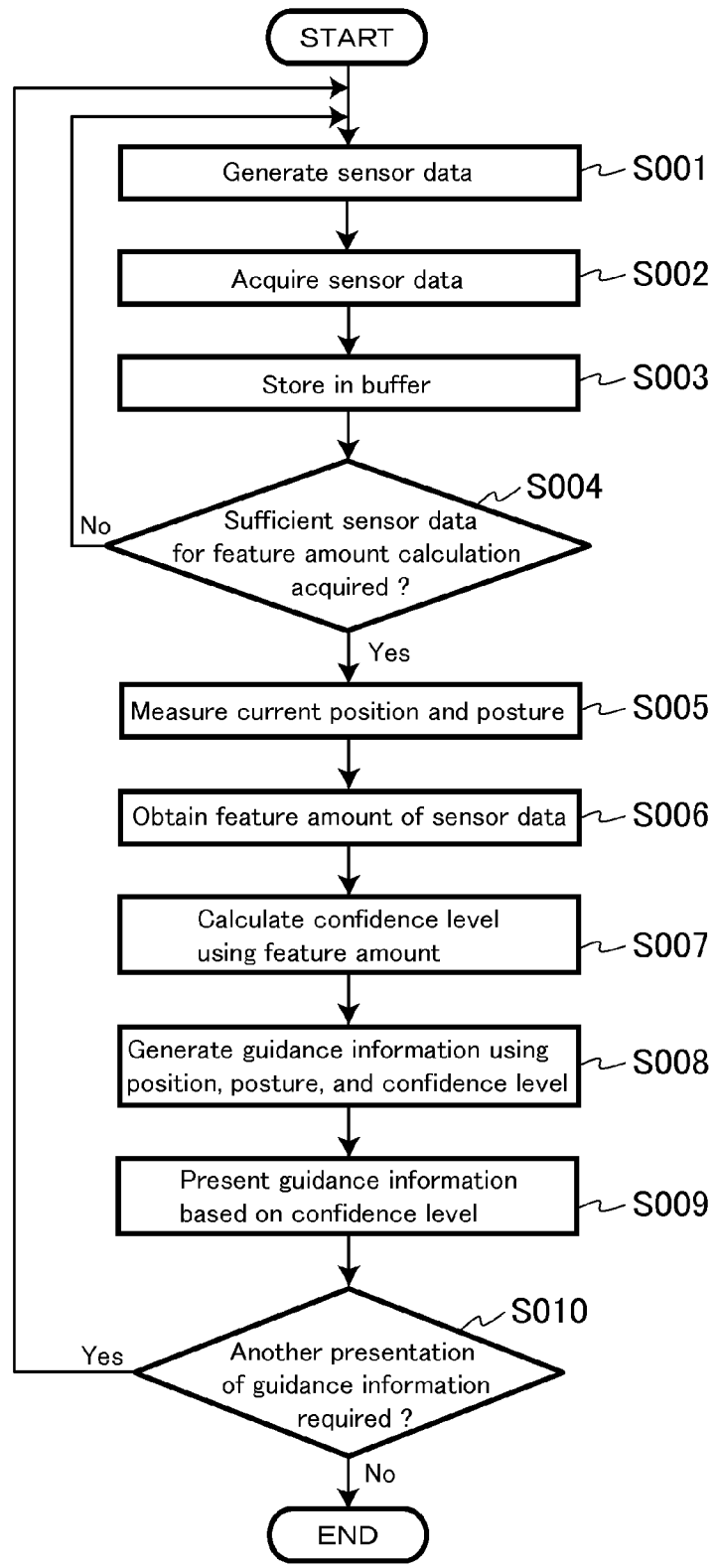
FIG. 5 is a flowchart schematically showing an example of the position information providing method in the first exemplary embodiment.

The flowchart of the position information providing method shown in FIG. 5 includes sensor data acquisition processing (1) and position and posture measurement processing and confidence level calculation processing (2). In the case where the position information providing method is performed only once, the processing (1) is followed by the processing (2). In the case where the position information providing method is continuously performed for several times, it is preferable to perform the processing (1) and the processing (2) simultaneously in parallel in view of processing efficiency. That is, it is preferable to perform the processing (1) simultaneously with the processing (2) for performing the next position information providing method. However, the present invention is not limited thereto.

First, the sensor data acquisition processing (1) will be described. That is, first, the sensor 101 installed in the inside of a terminal (position information providing apparatus) or attached to the outside of the terminal generates the sensor data based on the position and the posture of the position information providing apparatus. Next, the sensor data acquiring means 110 acquires sensor data at the current time from the sensor 101 (step S002: sensor data acquiring step). Then, the sensor data acquiring means 110 stores the sensor data acquired in the step S002 in a memory on the apparatus or a buffer formed on a storage medium such as a hard disk or the like (step S003). These steps S001 to S003 correspond to the sensor data acquisition processing (1). In the case where the sensor 101 is provided separately from the position information providing apparatus, the step S001 is performed separately from the steps of the position information providing method of the present invention, and the position information providing method of the present invention may be started from the step S002. Further, although the step S003 is optional, it is preferable to perform the step S003 in view of data processing efficiency.

Next, it is determined whether or not sensor data sufficient for feature amount calculation is acquired (step S004). There is no particular limitation on means for performing this determination, and examples thereof include common CPU and the like. In the case where sensor data sufficient for feature amount calculation is acquired, the procedure proceeds to the next step (step S005). In the case where sensor data sufficient for feature amount calculation is not acquired, the steps S001 to S003 are repeated. Further, even in the case where sensor data sufficient for feature amount calculation is acquired, for providing the next position information, the steps S001 to S003 may be performed again. In this manner, it is preferable to continuously perform the sensor data acquisition processing (1) by repeating the steps S001 to S003 in order.

Next, the position and posture measurement processing and the confidence level calculation processing (2) will be described. First, the position measuring means 160 measures the current position and posture of the position information providing apparatus by autonomous navigation commonly known by Patent Document 1 and the like using the sensor data acquired by the sensor data acquiring means 110 in the step S002 (i.e., the sensor data stored in a buffer in step S003) (step S005: position measuring step). Next, the feature amount calculating means 120 generates (calculates) a feature amount using the sensor data acquired by the sensor data acquiring means 110 in the step S002 (i.e., the sensor data stored in a buffer in step S003) (step S006: feature amount calculating step). For example, the feature amount calculated in the step S006 may include at least one of the feature amounts such as statistical amounts such as the variance, the average value, the maximum value, the minimum value, and the median value of the sensor data and the feature amounts relating to the form of waveform such as the number of peaks, the average interval of peak, and the like. Then, the confidence level calculating means 130 calculates the confidence level using the feature amount generated (calculated) in the step S006 (step S007: confidence level calculating step). These steps S005 to S007 correspond to the position and posture measurement processing and the confidence level calculation processing (2).

Further, the guidance information generating means 140 sets a scope of search in a space around the position information providing apparatus using the position and the posture acquired (measured) in the step S005 and the confidence level acquired (calculated) in the step S007, searches geographical information within the scope of search, and generates guidance information to be presented to a user (step S008: guidance information generating step). The geographical information may be, for example, shop information, tourist information, or the like. The shop information, the tourist information, or the like acquired by searching may be used directly as guidance information to be presented to a user. Then, the information presentation means 150 presents the guidance information acquired in the step S008 based on the confidence level calculated in the step S007 (step S009: information presentation step). In this manner, the position information providing method of the first exemplary embodiment can be performed. If there is a need to present another guidance information to a user by performing the same position information providing method, the procedure returns to the step S001 after the step S009 and the same steps are repeated.

Hereinafter, specific examples of the position information providing apparatus of the first exemplary embodiment (FIG. 1) and its operation (position information providing method of FIG. 5) will be described in detail. However, the first exemplary embodiment is not limited thereto. Note here that, although performance of a single processing (position information providing method) will be described below, as described above, the same procedures (sensor data acquisition processing, guidance information generation processing, and the like) may be repeated at regular intervals.

That is, here, the position information providing apparatus is, for example, a terminal (cellular phone or the like) provided with an acceleration sensor and a gyro sensor as the sensor 101. Here, the position information providing method is, for example, an indoor shop guidance service that presents shop information (shop name, catch phrase, or the like) as guidance information to a user. On this occasion, in the same manner as a commonly known AR application, a user views information by holding the terminal up to the surroundings. That is, on the terminal, the video image of the direction of the user facing at the present moment and the guidance information generated by the position information providing apparatus are presented.

In the step S001 of FIG. 5 (sensor data generating step), the acceleration and the angular speed of the terminal (position information providing apparatus) are generated (measured) as sensor data. The sensor data acquiring means 110 acquires the acceleration and the angular speed in the step S002 (sensor data acquiring step) and stores the acceleration and the angular speed in a buffer in the step S003. By continuously repeating the procedures of the steps S001 to S003, the acceleration and the angular speed are stored in a buffer.

In the step S005 of FIG. 5 (position measuring step), the position measuring means 160 measures the relative position and the posture of the position information providing apparatus from the entrance of a shop using autonomous navigation known by Patent Document 1 and the like. For example, the travel distance is calculated by grasping the up-and-down movement of the body of a user (that is, position information providing apparatus) from the change of the acceleration of the body of the user and then multiplying the number of the up-and-down movements by the stride. Further, by accumulating the angular speed of each unit time, the posture of a user (that is, position information providing apparatus) facing at a certain moment can be calculated. On the basis of the travel distance and the posture obtained as described above, the relative position and the posture from the entrance of a shop can be measured.

In the step S006 of FIG. 5 (feature amount calculating step), the feature amount calculating means 120 calculates a feature amount based on the statistical amount of the acceleration and the angular speed stored in a buffer in the step S003. In the first exemplary embodiment, as described above, the feature amount may be calculated by setting a time window for a past fixed period of time with respect to the acceleration and the angular speed stored in a buffer as shown in FIG. 4. Specifically, with respect to the acceleration, the variance, the number of peaks, and the average interval of peak of the acceleration within the time window can be the feature amount. With respect to the angular speed, one of or both of the average value and the maximum value within the time window can be the feature amount. Thereby, the feature amount 600 shown in the uppermost table of FIG. 6 is calculated. In the step S007 (confidence level calculating step) of FIG. 5, the confidence level calculating means 130 calculates the confidence level using the feature amount calculated in the step S006.

In this example, for example, the confidence level (confidence level 630) may be calculated as follows. That is, as shown in FIG. 6, the confidence level 610 relating to the acceleration is calculated based on the feature amount relating to the acceleration and the confidence level 620 relating to the angular speed is calculated based on the feature amount relating to the angular speed, and the average value of the confidence level 610 and the confidence level 620 is calculated as the confidence level (confidence level 630) in the time window.

In FIG. 6, the mathematical expressions in the box indicated by the "confidence level 610" are the expressions for calculating the confidence level 610 relating to the acceleration using the feature amount relating to the acceleration. As shown in FIG. 6, in the case where the confidence level is calculated using the variance or the number of peaks of the acceleration as the feature amount, the confidence level decreases if the variance or the number of peaks is equal to or more than a threshold (in FIG. 6, variance: 9000, number of peaks: 10). In the case where the confidence level is calculated using the average interval of peak of the acceleration as the feature amount, the confidence level shows the highest value at a certain value (in FIG. 6, average interval of peak: 90) and the confidence level decreases with distance from the certain value.

Further, in FIG. 6, the mathematical expressions in the box indicated by the "confidence level 620" are the expressions for calculating the confidence level 620 relating to the angular speed using the feature amount relating to the angular speed. As shown in FIG. 6, in the case where the confidence level 620 is calculated using the average value of the angular speed as the feature amount, the confidence level shows the highest value at a certain value (in FIG. 6, average value: 90) and the confidence level decreases with distance from the certain value. In the case where the confidence level 620 is calculated using the number of peaks of the angular speed as the feature amount, the confidence level decreases if the number of peaks is equal to or more than a threshold (in FIG. 6, number of peaks: 500).

Furthermore, in FIG. 6, the mathematical expressions in the box indicated by the "confidence level 630" are the expressions for calculating the confidence level 630 in the current time window from the confidence levels 610 and 620 calculated on the basis of the respective feature amounts.

Figure 7:
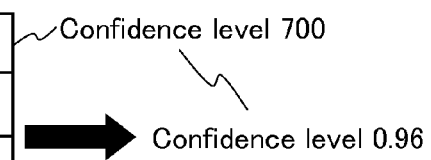
FIG. 7 is another view for showing a specific example of the calculation method of the confidence level in the first exemplary embodiment.

The confidence level 610 relating to the acceleration and the confidence level 620 relating to the angular speed calculated with reference to the respective feature amounts in FIG. 6 are collectively summarized as the "confidence level 700" in FIG. 7. Further, in the case where the average value of the respective confidence levels is calculated as the confidence level 630, the confidence level 630 is 0.96 as described in FIG. 7.

Next, in the step S008 of FIG. 5 (guidance information generating step), the guidance information generating means 140 generates guidance information based on the position and the posture measured in the step S005 and the confidence level calculated in the step S007. In this example, as shown in FIG. 2A, a sector-shaped scope of search expanding side to side from the facing direction (posture) centering the current position is set, and surrounding geographical information (for example, shop information) is searched. Here, the geographical information (for example, shop information) is stored in a commonly known database (for example, as described above), and the geographical information within the scope of search that has been set is searched.

In this example, the radius and the central angle of the sector of FIG. 2A are set based on the confidence level (confidence level 630) calculated in FIGS. 6 and 7. More specifically, for example, the scope of search is set by the expressions indicated by the "scope of search 210" in FIG. 2B. The "confidence level" described in the box indicated by the "scope of search 210" is the confidence level (confidence level 630) calculated in FIGS. 6 and 7. On the basis of this expression, when the scope of search is calculated using the confidence level 700 of FIG. 7 (confidence level 630 of FIG. 6), since the confidence level 700 (confidence level 630) is 0.96 as described above, the scope of search is calculated as 220 of FIG. 2B.

In the step S009 of FIG. 5, the information presentation means 150 displays (presents to a user) the guidance information generated in the step S008 based on the confidence level 630 calculated in the step S007 on a terminal. In this example, the display method of the screen on the terminal is selected according to the level of the confidence level 630. Specifically, in the case where the confidence level 630 is high, for example, the display method of the screen 300 shown in FIG. 3A is selected, and guidance information matching a shop in a landscape video image in the screen is displayed. On the other hand, in the case where the confidence level 630 is low, for example, the display method of the screen 310 shown in FIG. 3B is selected and guidance information is displayed as a list. For example, the screen 300 may be selected in the case where the confidence level 630 is 0.5 or more and the screen 310 may be selected in the case where the confidence level is less than 0.5. Since the confidence level calculated in the step 005 is 0.96 (which means more than 0.5), the screen 300 is selected and guidance information is displayed on a terminal.

The position information providing apparatus of FIG. 1 and the position information providing method of FIG. 5 were described with reference to specific examples. However, these are mere examples and various changes can be made. For example, the mathematical expressions of the confidence levels, the setting method of the scope of search using the confidence levels, and the like in this example are mere examples and they can be set appropriately according to a sensor, a terminal, guidance information to be presented, and the like. For example, in the confidence level calculating step (step S007 in FIG. 5) in which the confidence level is calculated using the feature amount, by setting a threshold for the feature amount, the confidence level may be set 0 or 1 depending on whether the value is equal to or more than the threshold or is less than the threshold. Further, at the time of setting the scope of search in the guidance information generating step (step 008 in FIG. 5), for example, the central angle may be fixed at 360° and only radius may be adjusted using the confidence level.

The examples of the display method of the screen described in this example are mere examples and other presentation methods can be employed. For example, in the case where the confidence level is low, guidance information may be displayed not on the AR but on a map. Further, instead of displaying a list on a video image, by preparing a button or the like, a dialogue or a browser showing surrounding shop information by pressing the button may be started up. Furthermore, information to be presented may not only be a character string or an image but also be video and the like. On this occasion, the videos preliminarily stored in a database in a terminal may be used or videos may be acquired from video-sharing websites and streaming websites on the Internet such as YouTube (trademark) and Ustream (trademark).

Although an acceleration sensor and a gyro sensor are intended as the sensor 101 in this example, an electronic compass, a microphone, an illuminance sensor, and the like may be employed as the sensor 101. In such a case, the confidence level calculation may be performed by further increasing the mathematical expression for calculating the confidence level as described in this example.

In the information presentation step (step S009 in FIG. 5), for example, in the case where the confidence level is equal to or less than a threshold (for example, a small value such as 0.1), the device may present to a user a message that the measurement result is unavailable. Specifically, for example, the message such as "the measurement accuracy is seriously decreased", "unavailable", or the like may be presented.

Since the position information providing apparatus described in the first exemplary embodiment includes the confidence level calculating means that can calculate the confidence level of the measurement result based on the measurement method of the position and the posture or on the property of the sensor data, the confidence level of the measurement result of the position and the posture can be calculated with high accuracy. Further, on the basis of the measured position and posture, accurate search and accurate presentation of guidance information can be performed without any feeling of discomfort.

Note here that, in the position information providing apparatus of the present invention, components except for the sensor data acquiring means, the feature amount calculating means, and the confidence level calculating means are optional. However, in view of the information presentation to a user, as described in the first exemplary embodiment, preferably, the position information providing apparatus of the present invention further includes position measuring means, guidance information generating means, and information presentation means. Further, as described in the first exemplary embodiment, preferably, the information presentation means controls (switches) guidance information to be presented to a user according to the level of the confidence level, although it can be means for simply presenting guidance information to a user. Presenting information suitable for the condition of a user based on the level of the confidence level allows, for example, information presentation taking the discrepancy between an actual view and information to be presented on the AR or the like into consideration, and this allows the reduction of feeling of discomfort in use. Here, Patent Document 1 discloses a user search using the confidence level and a method of measuring the positions of more than one person present at the same place based on the confidence level. However, Patent Document 1 does not disclose information presentation and navigation using the confidence level.

In the sensor data, there is no particular limitation on the statistical amount. As described in the first exemplary embodiment, examples of the statistical amount include the variance, the average value, the maximum value, the minimum value, and the median value of the multiple pieces of data. Further, there is no particular limitation on the amount showing the form of the sensor data. For example, as described in the first exemplary embodiment, the amount may be a feature amount relating to the waveform (for example, number of peaks, average interval of peak, and the like). Furthermore, in view of further increasing the calculation accuracy of the confidence level, for example, as described in the first exemplary embodiment, preferably, the feature amount is more than one kind, the confidence levels based on the respective feature amounts are calculated, and the confidence level of the whole (current confidence level) is calculated based on the respective confidence levels.

Further, besides directly acquiring from the sensor, the sensor data may be temporarily recorded (stored) in a file, a database, or the like and then acquired from the file, the database, or the like by the sensor data acquiring means. The file, the database, or the like may be contained in the position information providing apparatus of the present invention itself or in a server or the like separately provided from the position information providing apparatus of the present invention, for example. As described above, the first position information providing system of the present invention includes the position information providing apparatus of the present invention and a server. The server is recorded with the sensor data and the sensor data acquiring means acquires the sensor data from the server. For example, the server may contain a file, a database, or the like being stored with the sensor data. Further, for example, the server may be a server connected to the Internet, and the sensor data may be uploaded to the server via the sensor and recorded (stored) in the server.

The server in the first position information providing system of the present invention may be the same server as the server in the second position information providing system of the present invention. In other words, the server in the first position information providing system of the present invention may also serve as the server in the second position information providing system of the present invention. Also, the server in the first position information providing system of the present invention may be a server that is different from the server in the second position information providing system of the present invention. Note here that, the data to be recorded (stored) in the server is not limited to the sensor data or the guidance information generation data, and any data can be recorded (stored) in the server.

Exemplary Embodiment 2

Next, the second exemplary embodiment of the present invention will be described.

Figure 8:
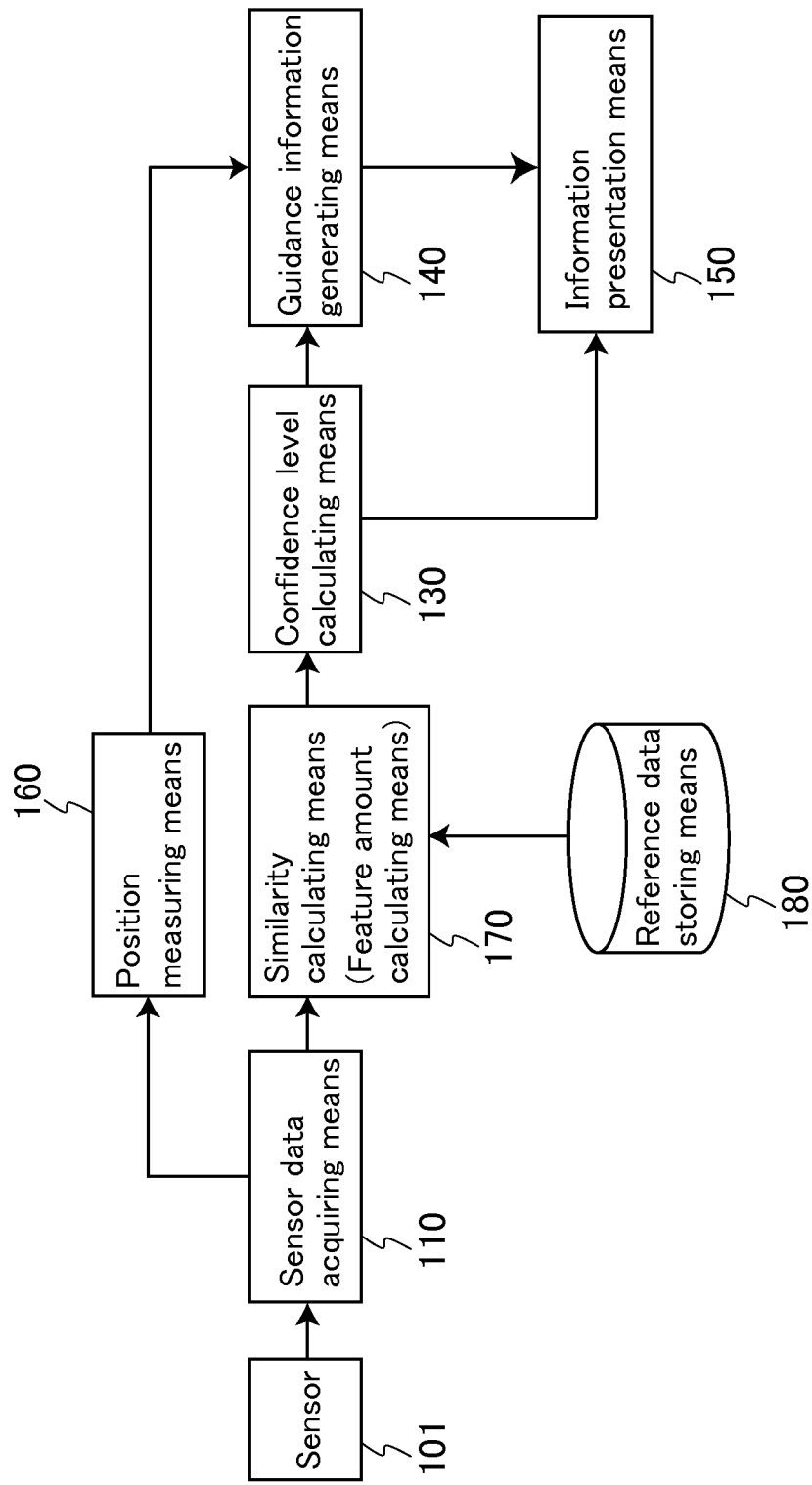
FIG. 8 is a block diagram schematically illustrating the configuration of the position information providing apparatus in the second exemplary embodiment of the present invention.

FIG. 8 is a block diagram schematically showing an example of the position information providing apparatus of the second exemplary embodiment. As shown in FIG. 8, the position information providing apparatus of the second exemplary embodiment is different from the position information providing apparatus of FIG. 1 (first exemplary embodiment) in that the position information providing apparatus of the second exemplary embodiment includes similarity calculating means (unit) 170 instead of the feature amount calculating means 120, and further includes reference data storing means (unit) 180. Except for these, the position information providing apparatus of the second exemplary embodiment is the same as the position information providing apparatus of FIG. 1 (first exemplary embodiment). Here, in the present invention, "similarity" is a kind of the feature amount. In the apparatus of FIG. 8, although the similarity calculating means 170 is feature amount calculating means, it is simply referred to as the "similarity calculating means" in the second exemplary embodiment for convenient sake. In the present invention, for example, as in the second exemplary embodiment, the feature amount may include the similarity between the sensor data acquired in the sensor data acquiring step and the reference data in addition to or instead of the statistical amount of the multiple pieces of sensor data and the amount showing the form of the sensor data.

In the second exemplary embodiment, it is checked whether or not the sensor data acquired by the sensor data acquiring means 110 is sensor data close to (similar to) the action of a user preliminarily expected at the time of designing the apparatus, and the confidence level is calculated according to the degree (similarity). That is, in the case where a user acts differently from what is expected (in the case where similarity is low), it is considered that the confidence level of the measurement result of the position and the posture of a user (that is, position information providing apparatus) is low.

Figures 10A, 10B, 10C:
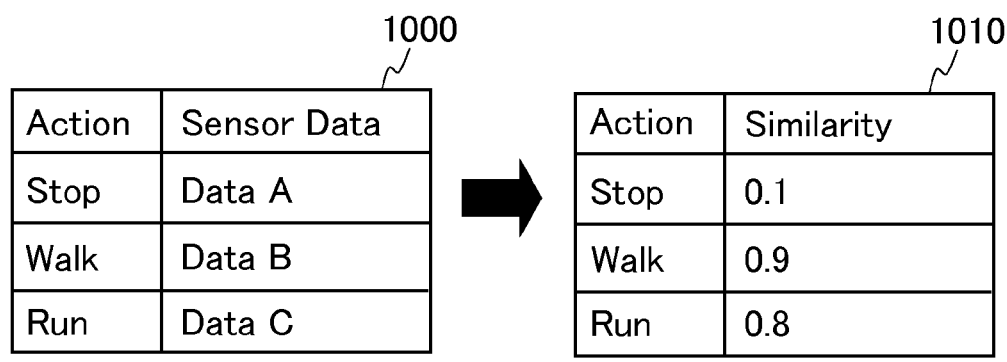
FIGS. 10A to 10C are views for showing specific examples of the calculation results of the similarity in the second exemplary embodiment.

The reference data storing means 180 stores the sensor data at the time when a user (that is, position information providing apparatus) acts what is preliminarily expected at the time of designing the apparatus as reference sensor data. For example, in the case where the actions such as "walk" and "stop" are expected at the time of designing the apparatus, common sensor data of "walk" and "stop" is collected and, as shown in FIG. 10A, the sensor data is stored in the reference data storing means 180 associated with the action.

The similarity calculating means 170 calculates the similarity between the sensor data acquired by the sensor data acquiring means 110 and the reference data of each action stored in the reference data storing means 180. The similarity may be calculated by a commonly known method. For example, the Euclidean distance and the cosine similarity may be calculated as the similarity using the data of the same time window; or the similarity may be calculated using dynamic programming and dynamic time warping.

The confidence level calculating means 130 calculates the confidence level based on the similarity between the sensor data and the reference data of each action calculated by the similarity calculating means 170. For example, the highest similarity may be directly used as the confidence level.

Next, an example of the operation of the entire position information providing apparatus of FIG. 8 (position information providing method of second exemplary embodiment) will be described with reference to FIG. 8 and the flowchart of FIG. 9.

The operation of the entire position information providing apparatus of FIG. 8 (second exemplary embodiment) (position information providing method of second exemplary embodiment) is different from the operation of the position information providing apparatus of the first exemplary embodiment in that the similarity calculating means 170 calculates the similarity between the sensor data and the data stored in the reference data storing means 180 and the confidence level calculating means 130 calculates the confidence level using the similarity. Except for these, the operation of the position information providing apparatus of the second exemplary embodiment is the same as that of the first exemplary embodiment. That is, the operations of the steps S001 to S005 and S008 to S010 of FIG. 9 can be performed in the same manner as in the first exemplary embodiment.

Figure 9:
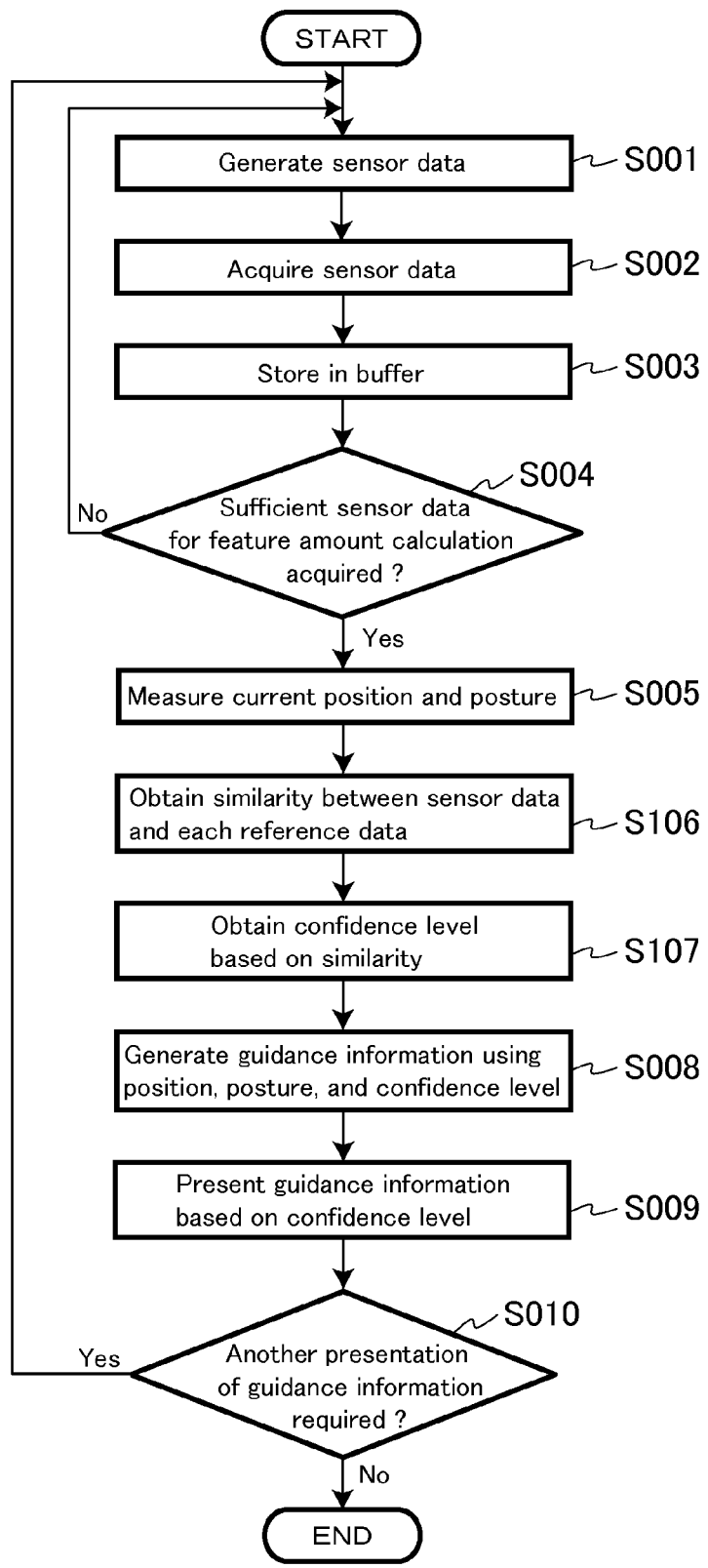
FIG. 9 is a flowchart schematically showing an example of the position information providing method in the second exemplary embodiment.

In the flowchart of FIG. 9, as a confidence level calculating step, the step S106 is performed instead of the step S006 of FIG. 5 (first exemplary embodiment). Specifically, in the step S106, the similarity calculating means 170 calculates the similarity between the sensor data stored in a buffer in the step S003 and the reference data of each action stored in the reference data storing means 180. Here, as described above, although the step S106 is a feature amount calculating step, it is referred to as the "similarity calculating step" in the second exemplary embodiment for convenient sake.

Further, in the flowchart of FIG. 9, as a confidence level calculating step, the step S107 is performed instead of the step S007 of FIG. 5 (first exemplary embodiment). Specifically, in the step S107, the confidence level calculating means 130 calculates a confidence level based on the similarity between the sensor data and the reference data of each action calculated in the step S106 (similarity calculating step).

Hereinafter, specific examples of the position information providing apparatus of the second exemplary embodiment (FIG. 8) and its operation (position information providing method of FIG. 9) will be described in detail. However, the second exemplary embodiment is not limited thereto.

As described above, the operation of the entire position information providing apparatus of FIG. 8 (second exemplary embodiment) (position information providing method of second exemplary embodiment) is different from the operation of the position information providing apparatus of the first exemplary embodiment in that the similarity calculating means 170 calculates the similarity between the sensor data and the data stored in the reference data storing means 180 and the confidence level calculating means 130 calculates the confidence level using the similarity. Except for these, operation of the position information providing apparatus of the second exemplary embodiment can be performed in the same manner as that of the first exemplary embodiment. The specific examples below will be described with reference to the case in which the reference data storing means 180 stores the acceleration data and the angular speed data relating to "stop", "walk", and "run" in a fixed period of time as shown in 1000 of FIG. 10B as reference data.

In the step S106 of FIG. 9 (similarity calculating step), the sensor data having the same data length as the reference data stored in the reference data storing means 180 is acquired from a buffer in reverse chronological order from the current time, the cosine similarity between the sensor data and each reference data of "stop", "walk", and "run" is calculated, and 1010 of FIG. 10C is acquired.

In the step S107 of FIG. 9 (confidence level calculating means), the confidence level calculating means 130 selects the highest similarity among the similarities between the sensor data and the reference data of each action calculated in the step S106 as the confidence level. In the case of 1010 of FIG. 10C, since the highest similarity is 0.9, the confidence level calculating means 130 selects 0.9 and defines the confidence level as 0.9.

Although this example is described with reference to the case of employing the cosine similarity, other similarity calculation method may be employed. For example, the Euclidean distance and the cosine similarity may be calculated as the similarity using the data of the same time window; or the similarity may be calculated using dynamic programming and dynamic time warping. The relationship between the reference data and a single action is not limited to one-on-one relationship. For example, multiple pieces of data may be stored with reference to a single action, the similarity between the sensor data and each of the multiple pieces of data may be calculated, and the average value, the median value, or the like of the entire similarities may be regarded as the similarity of the action.

Since the position information providing apparatus of the second exemplary embodiment includes the confidence level calculating means (similarity calculating means) that can calculate the confidence level based on the deviation from an action preliminarily expected at the time of designing the apparatus, the confidence level of the measurement result of the position and the posture can be calculated with high accuracy. Further, on the basis of the measured position and posture, accurate search and accurate presentation of guidance information can be performed without any feeling of discomfort.

Exemplary Embodiment 3

Next, the third exemplary embodiment of the present invention will be described.

Figure 11:
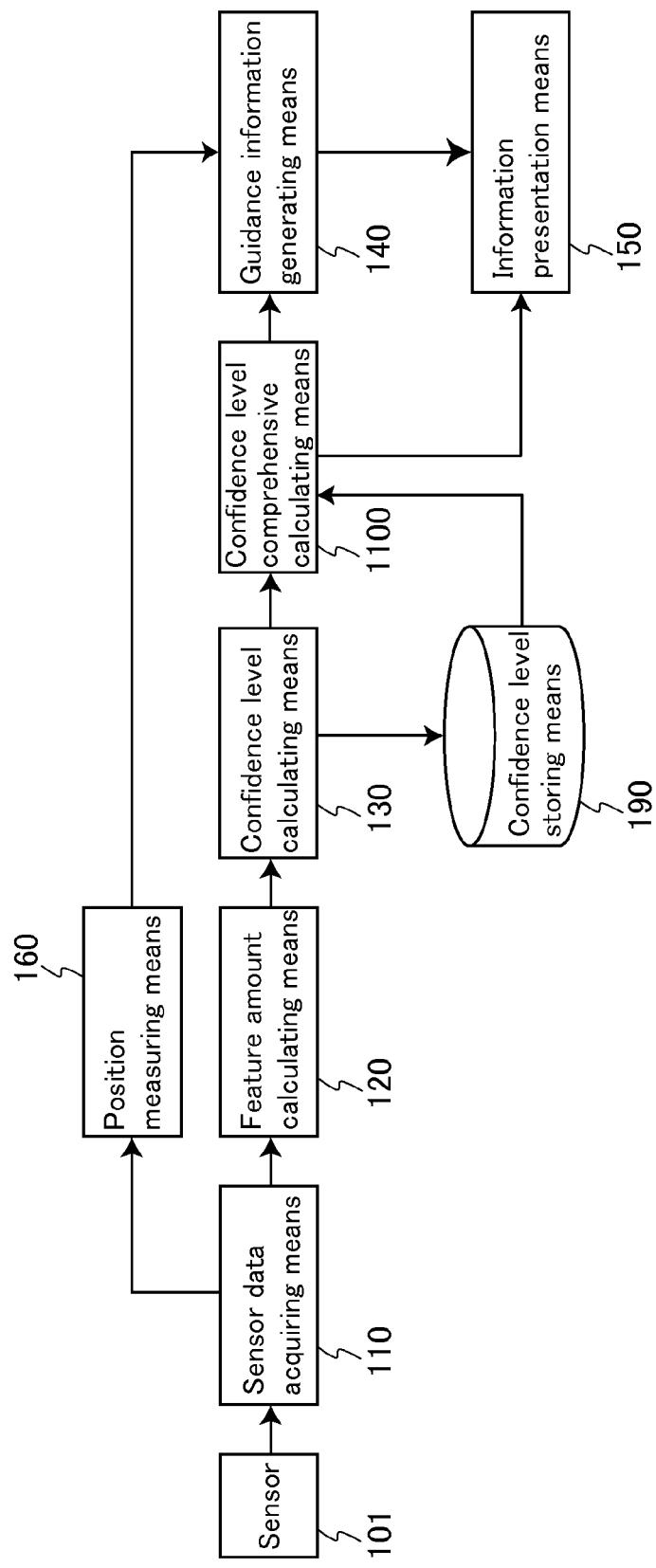
FIG. 11 is a block diagram schematically illustrating the configuration of the position information providing apparatus in the third exemplary embodiment of the present invention.

FIG. 11 is a block diagram schematically showing an example of the position information providing apparatus of the third exemplary embodiment. As shown in FIG. 11, the position information providing apparatus of the third exemplary embodiment is different from the position information providing apparatus of FIG. 1 (first exemplary embodiment) in that the position information providing apparatus of the third exemplary embodiment further includes confidence level storing means (unit) 190 and confidence level comprehensive calculating means (unit) 1100 in addition to the components of the position information providing apparatus of the first exemplary embodiment. Except for these, the position information providing apparatus of the third exemplary embodiment is the same as the position information providing apparatus of FIG. 1 (first exemplary embodiment).

In the first exemplary embodiment, the guidance information generation and the information presentation are performed based on the confidence level calculated by the confidence level calculating means 130. In the third exemplary embodiment, a current confidence level is newly calculated based on the confidence level calculated in a past fixed period of time and the current confidence level is utilized for the guidance information generation and the information presentation.

The confidence level calculating means 130 calculates the confidence level based on the feature amount calculated by the feature amount calculating means 120 in the same manner as in the first exemplary embodiment. The confidence level storing means 190 stores the confidence level calculated by the confidence level calculating means 130 together with the calculation time. More specifically, for example, as shown in 1200 of FIG. 12, the confidence level storing means 190 stores the confidence level in association with the calculation time. In 1200 of FIG. 12, the elapsed time after startup of the apparatus is used as the time, and the confidence level at the time is stored.

The confidence level comprehensive calculating means 1100 calculates the current confidence level using the confidence level in a fixed period of time stored by the confidence level storing means 190. Specifically, for example, the average value of the confidence levels in a past fixed period of time may be calculated as the current confidence level or the maximum confidence level may be calculated as the current confidence level.

The guidance information generating means 140 generates guidance information based on the current confidence level calculated by the confidence level comprehensive calculating means 1100 and the position and the posture measured by the position measuring means 160.

The information presentation means 150 displays (presents to a user) guidance information generated by the guidance information generating means 140 using the confidence level calculated by the confidence level comprehensive calculating means 1100 on a terminal.

Next, an example of the operation of the entire position information providing apparatus of FIG. 11 (position information providing method) will be described with reference to FIG. 11 and the flowchart of FIG. 13.

The operation of the entire position information providing apparatus (position information providing method) of the third exemplary embodiment is different from the operation of the position information providing apparatus of the first exemplary embodiment in that the guidance information generating step and the information presentation step are performed using the current confidence level calculated by the confidence level comprehensive calculating means 1100 instead of the confidence level calculated by the confidence level calculating means 130. Except for this, the operation of the position information providing apparatus of the third exemplary embodiment can be performed in the same manner as that of the first exemplary embodiment.

The operations of the steps S001 to S007 and S010 of FIG. 9 are the same as those of the first exemplary embodiment.

Here, in this example, the confidence level storing means 190 is preliminarily stored with past confidence levels.

In this example, instead of the steps S008 to S009 of FIG. 5 (first exemplary embodiment), the steps S301, S302, S308, and S309 are performed. That is, first, the confidence level storing means 190 stores the confidence level calculated in the step S007 (step S301: confidence level storing step). Next, the confidence level comprehensive calculating means 1100 generates (calculates) the current confidence level using the confidence level stored in the step S301 and the preliminarily stored past confidence levels (step S302: confidence level comprehensive calculating step). Further, the guidance information generating means 140 generates guidance information based on the confidence level calculated in the step S302 and the position and the posture measured in the step S005

(step S308: guidance information generating step). Then, the information presentation means 150 presents the guidance information generated in the step S308 based on the confidence level calculated in the step S302 to a user (step S309: information presentation step).

Hereinafter, specific examples of the position information providing apparatus of the third exemplary embodiment (FIG. 11) and its operation (position information providing method of FIG. 13) will be described in detail. However, the third exemplary embodiment is not limited thereto.

As described above, the operation of the entire position information providing apparatus (position information providing method) of the third exemplary embodiment is different from the operation of the position information providing apparatus of the first exemplary embodiment in that the guidance information generating step and the information presentation step are performed using the current confidence level calculated by the confidence level comprehensive calculating means 1100 instead of the confidence level calculated by the confidence level calculating means 130. Further, in this example, the confidence level comprehensive calculating means 1100 calculates the current confidence level based on the past confidence levels stored in the confidence level storing means 190 and the confidence level calculated by the confidence level calculating means 130. Except for these, the operation of the information providing apparatus of the third exemplary embodiment can be performed in the same manner as that of the first exemplary embodiment.

In the guidance information generating step performed by the guidance information generating means 140 (step S308 in FIG. 13) and the information presentation step performed by the information presentation means 150 (step S309 in FIG. 13), the confidence level calculated by the confidence level comprehensive calculating means 1100 is used instead of the confidence level calculated by the confidence level calculating means 130. Except for this, these steps can be performed in the same manner as the guidance information generating step (step S008 in FIG. 5) and the information presentation step (step S009 in FIG. 5) of the first exemplary embodiment.

Figure 12:
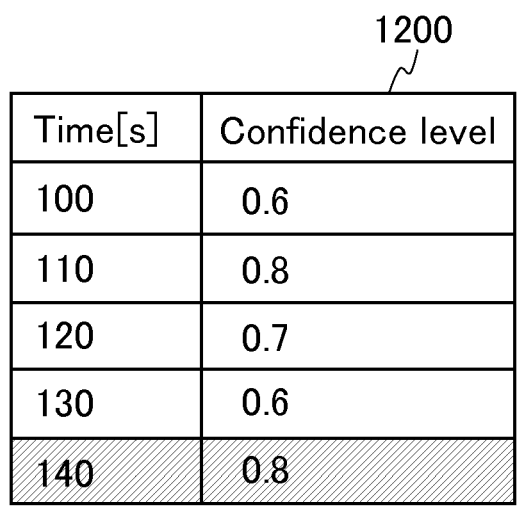
FIG. 12 is a view for showing a specific example of the storing method of the confidence level in the third exemplary embodiment.
Figure 13:
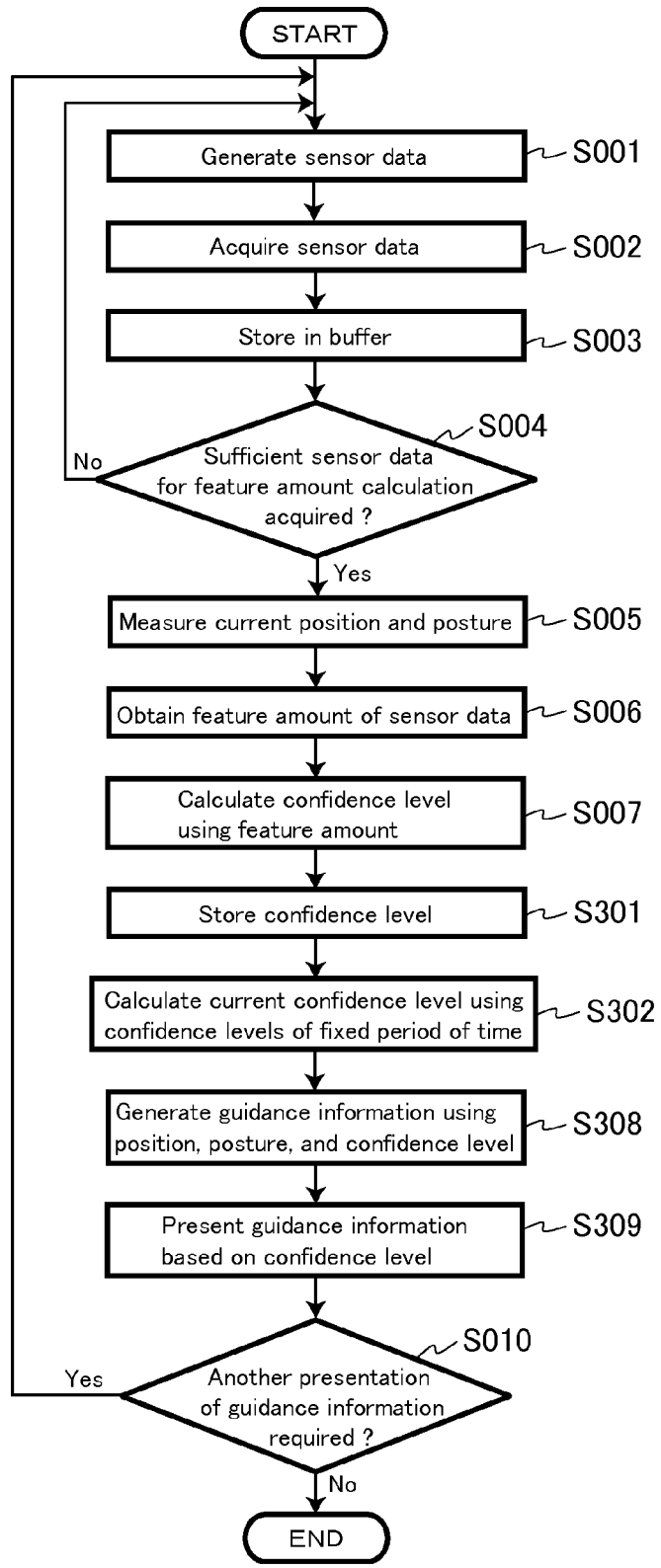
FIG. 13 is a flowchart schematically showing an example of the position information providing method in the third exemplary embodiment.

In the step S301 of FIG. 13, the confidence level calculated by the confidence level calculating means 130 is stored by the confidence level storing means 190. Further, in this example, as shown in 1200 of FIG. 12, the confidence level storing means 190 is preliminarily stored with past confidence levels.

1200 of FIG. 12 shows the case in which the confidence level storing means 190 stores, as the latest confidence level, the time and confidence level as follows: "time: 140 [s]" and "confidence level: 0.8".

In the step S302 of FIG. 13, the confidence level comprehensive calculating means 1100 calculates the current confidence level based on the past confidence levels preliminarily stored in the confidence level storing means 190 and the confidence level calculated by the confidence level calculating means 130. There is no particular limitation on the method of calculating the current confidence level. In this example, the average value of the confidence levels in past 30 seconds is calculated as the current confidence level. In the case of 1200 of FIG. 12, the following values are extracted as the confidence levels in past 30 seconds: (time, confidence level)=(140, 0.8), (130, 0.6), (120, 0.7), and (110, 0.8). The average value of these confidence levels is 0.725 and this value is the current confidence level.

As another method of calculating the current confidence level, for example, in the step S302 of FIG. 13, the confidence level comprehensive calculating means 1100 may calculate the current confidence level by multiplying all the past confidence levels. In the case of 1200 of FIG. 12, the current confidence level is as follows: 0.6×0.8×0.7×0.6×0.8=0.16. This confidence level shows a cumulative confidence level from the past, and the decrease in the confidence level based on the time series can be grasped.

Figure 14A:
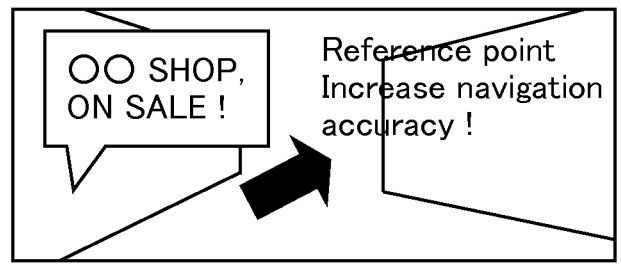
FIGS. 14A and 14B are views for schematically showing examples of the information presentation method used in the third exemplary embodiment.
Figure 14B:
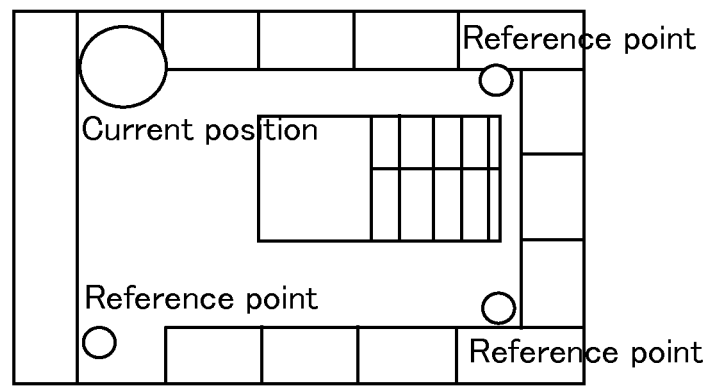

In the case where the current confidence level is low, since adjustment (calibration) is required for accurately performing the position and posture measurement, in the step S309 (information presentation step), it is possible to encourage a user to move to a reference point (a doorway, a marker the position and the posture thereof are preliminarily known, or the like) to guide a user so that the position and posture measurement can be performed with high accuracy. Examples of the information presentation method at this time include the method of displaying on the AR as shown in FIG. 14A and the method of displaying using a map as shown in FIG. 14B. Further, at this time, in the case where a user (that is, position information providing apparatus) reaches a reference point, all the confidence levels stored in the confidence level storing means 190 may be deleted or moved to a separately provided database or the like, and confidence levels may be newly stored.

Here, in this example, the average value and the product of past confidence levels are used for the confidence level calculation method of the confidence level comprehensive calculating means 1100. However, other methods may be employed. For example, the median value, the maximum value, the minimum value, and the like may be used. Further, the confidence level calculated by the confidence level comprehensive calculating means 1100 may further be stored in the confidence level storing means 190 and the calculated confidence level may be used for the confidence level calculation.

Since the current confidence level is calculated in consideration of past confidence levels in the third exemplary embodiment, accidental heightening or lowering of the confidence level can be avoided, and the confidence level can be calculated with high accuracy. Further, grasping the decrease of the confidence level makes it possible to guide a user to a reference point, and therefore services such as information delivery, navigation, and the like based on highly accurate position and posture measurement can be performed continuously.

The first to the third exemplary embodiments were described. However, the present invention is not limited thereto and various changes can be made. For example, although the confidence level is calculated using the aforementioned feature amounts of the sensor data in the first exemplary embodiment and the confidence level is calculated using the similarity as the feature amount in the second exemplary embodiment, the respective confidence levels may be calculated and combined. For example, the average of both of the confidence levels may be employed as the current confidence level or a higher confidence level of the confidence levels may be employed as the current confidence level. Further, although the method of calculating the current confidence level by storing the confidence level calculated in the first exemplary embodiment is described in the third exemplary embodiment, the current confidence level may be calculated by storing the confidence level calculated in the second exemplary embodiment or the current confidence level may be calculated by storing the confidence level calculated using the confidence levels of the first exemplary embodiment and the second exemplary embodiment.

INDUSTRIAL APPLICABILITY

The present invention can be applied to information delivery in shop, especially tourist information delivery, advertisement delivery, navigation, and the like. However, the present invention is not limited thereto and can be applied to any use. Further, as described above, the present invention can be applied to both indoor use and outdoor use.

A part of or the whole of the embodiments described above can also be described as the supplementary notes below. However, the embodiments are not limited to the supplementary notes below.

(Supplementary Note 1)

A position information providing apparatus including:
a sensor data acquiring unit acquiring sensor data;
a feature amount calculating unit calculating a feature amount from the sensor data; and
a confidence level calculating unit calculating a confidence level using the feature amount,
wherein
the sensor data is more than one, and
the feature amount includes a statistical amount of more than one piece of the sensor data and an amount showing a form of the sensor data.

(Supplementary Note 2)

The apparatus according to supplementary note 1, further including:
a position measuring unit measuring a position and a posture of the position information providing apparatus by autonomous navigation using the sensor data;
a guidance information generating unit generating guidance information to be presented to a user by setting a scope of search in a space around the position information providing apparatus using the position, the posture, and the confidence level and by searching geographical information within the scope of search; and
an information presentation unit presenting the guidance information to a user.

(Supplementary Note 3)

The apparatus according to supplementary note 1 or 2, wherein
the statistical amount includes at least one selected from the group consisting of a variance, an average value, a maximum value, a minimum value, and a median value of more than one piece of the sensor data.

(Supplementary Note 4)

The apparatus according to supplementary note 3, wherein the confidence level calculating unit calculates a confidence level using at least one selected from the group consisting of the variance, the average value, the maximum value, the minimum value, and the median value.

(Supplementary Note 5)

The apparatus according to any one of supplementary notes 1 to 4, wherein
a form of the sensor data is a waveform, and
an amount showing the form of the sensor data includes at least one of a peak of the waveform and a peak interval of the waveform.

(Supplementary Note 6)

The apparatus according to supplementary note 5, wherein the confidence level calculating unit calculates the confidence level using at least one of a peak of the waveform and a peak interval of the waveform.

(Supplementary Note 7)

The apparatus according to any one of supplementary notes 1 to 6, further including:
a reference data storing unit storing sensor data of a particular action as reference data, wherein
the feature amount includes similarity between the sensor data acquired by the sensor data acquiring unit and the reference data in addition to or instead of a statistical amount of more than one piece of the sensor data and an amount showing a form of the sensor data, and
the confidence level calculating unit calculates the confidence level using the similarity.

(Supplementary Note 8)

The apparatus according to supplementary note 7, wherein the confidence level calculating unit calculates the confidence level using a maximum value of the similarity.

(Supplementary Note 9)

The apparatus according to any one of supplementary notes 1 to 8, further including:
a confidence level storing unit storing the confidence level; and
a confidence level comprehensive calculating unit calculating a current confidence level using the confidence level stored in the confidence level storing unit.

(Supplementary Note 10)

The apparatus according to supplementary note 9, wherein the confidence level stored in the confidence level storing unit is more than one, and
the confidence level comprehensive calculating unit calculates a current confidence level using an average or a product of the confidence levels stored in the confidence level storing unit.

(Supplementary Note 11)

The apparatus according to any one of supplementary notes 1 to 10, further including:
a sensor, wherein
the sensor generates the sensor data based on a position and a posture of the position information providing apparatus.

(Supplementary Note 12)

A position information providing system including:
the position information providing apparatus according to any one of supplementary notes 1 to 11; and
a server, wherein
the server is recorded with the sensor data, and
the sensor data acquiring unit acquires the sensor data from the server.

(Supplementary Note 13)

A position information providing system including:
the position information providing apparatus according to any one of supplementary notes 2 to 11; and
a server, wherein
the server is recorded with guidance information generation data,
the position information providing apparatus further includes a guidance information generation data acquiring unit acquiring the guidance information generation data from the server, and
the guidance information generating unit further generates the guidance information using the guidance information generation data.

(Supplementary Note 14)

A position information providing method using the position information providing apparatus according to supplementary note 1, including:
a sensor data acquiring step of acquiring sensor data by the sensor data acquiring unit;
a feature amount calculating step of calculating a feature amount from the sensor data by the feature amount calculating unit; and
a confidence level calculating step of calculating a confidence level using the feature amount by the confidence level calculating unit, wherein the sensor data is more than one, and
the feature amount includes a statistical amount of more than one piece of the sensor data and an amount showing a form of the sensor data.

(Supplementary Note 15)

The method according to supplementary note 14, the position information providing apparatus being the position information providing apparatus according to supplementary note 2, further including:
a position measuring step of measuring a position and a posture of the position information providing apparatus by autonomous navigation using the sensor data by the position measuring unit;
a guidance information generating step of generating guidance information to be presented to a user by the guidance information generating unit by setting a scope of search in a space around the position information providing apparatus using the position, the posture, and the confidence level and by searching geographical information within the scope of search; and
an information presentation step of presenting the guidance information to a user by the information presentation unit.

(Supplementary Note 16)

The method according to supplementary note 14 or 15, the position information providing apparatus being the position information providing apparatus according to supplementary note 3, wherein
the statistical amount includes at least one selected from the group consisting of a variance, an average value, a maximum value, a minimum value, and a median value of more than one piece of the sensor data.

(Supplementary Note 17)

The method according to supplementary note 16, the position information providing apparatus being the position information providing apparatus according to supplementary note 4, wherein
in the confidence level calculating step, a confidence level is calculated using at least one selected from the group consisting of the variance, the average value, the maximum value, the minimum value, and the median value.

(Supplementary Note 18)

The method according to any one of supplementary notes 14 to 17, the position information providing apparatus being the position information providing apparatus according to supplementary note 5, wherein
a form of the sensor data is a waveform, and
an amount showing the form of the sensor data includes at least one of a peak of the waveform and a peak interval of the waveform.

(Supplementary Note 19)

The method according to supplementary note 18, the position information providing apparatus being the position information providing apparatus according to supplementary note 6, wherein
in the confidence level calculating step, the confidence level is calculated using at least one of a peak of the waveform and a peak interval of the waveform.

(Supplementary Note 20)

The method according to any one of supplementary notes 14 to 19, the position information providing apparatus being the position information providing apparatus according to supplementary note 7, further including:
a reference data storing step of storing sensor data of a particular action as reference data by the reference data storing unit, wherein
the feature amount includes similarity between the sensor data acquired in the sensor data acquiring step and the reference data in addition to or instead of a statistical amount of more than one piece of the sensor data and an amount showing a form of the sensor data, and
in the confidence level calculating step, the confidence level is calculated using the similarity.

(Supplementary Note 21)

The method according to supplementary note 20, the position information providing apparatus being the position information providing apparatus according to supplementary note 8, wherein
in the confidence level calculating step, the confidence level is calculated using a maximum value of the similarity.

(Supplementary Note 22)

The method according to any one of supplementary notes 14 to 21, the position information providing apparatus being the position information providing apparatus according to supplementary note 9, further including:
a confidence level storing step of storing the confidence level by the confidence level storing unit; and
a confidence level comprehensive calculating step of calculating a current confidence level by the confidence level comprehensive calculating unit using the confidence level stored in the confidence level storing unit.

(Supplementary Note 23)

The method according to supplementary note 22, the position information providing apparatus being the position information providing apparatus according to supplementary note 10, wherein
the confidence level stored in the confidence level storing step is more than one, and in the confidence level comprehensive calculating step, a current confidence level is calculated using an average or a product of the confidence levels stored in the confidence level storing step.

(Supplementary Note 24)

The method according to any one of supplementary notes 14 to 23, the position information providing apparatus being the position information providing apparatus according to supplementary note 11, further including:
a sensor data generating step of generating the sensor data by the sensor based on the position and the posture of the position information providing apparatus.

(Supplementary Note 25)

The method according to any one of supplementary notes 14 to 24 using the position information providing system according to supplementary note 12, wherein
in the sensor data acquiring step, the sensor data acquiring unit acquires the sensor data from the server.

(Supplementary Note 26)

The method according to any one of supplementary notes 14 to 25 using the position information providing system according to supplementary note 13, further including:
a guidance information generation data acquiring step of acquiring the guidance information generation data from the server by the guidance information generation data acquiring unit, wherein
in the guidance information generating step, the guidance information generating unit further generates the guidance information using the guidance information generation data.

(Supplementary Note 27)

A program, wherein a computer is caused to execute the position information presentation method according to any one of supplementary notes 14 to 26.

(Supplementary Note 28)

A recording medium being recorded with the program according to supplementary note 27 and being readable by a computer.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-260725 filed on Nov. 23, 2010, the disclosure of which is incorporated herein in its entirety by reference.

EXPLANATION OF REFERENCE NUMERALS 101 sensor
110 sensor data acquiring means
120 feature amount calculating means
130 confidence level calculating means
140 guidance information generating means
150 information presentation means
160 position measuring means
170 similarity calculating means
180 reference data storing means
190 confidence level storing means
201 scope of search with low confidence level
202 scope of search with high confidence level
203 estimated position/posture
210 scope of search
220 scope of search
300 screen
310 screen
600 feature amount
610 confidence level
620 confidence level
630 confidence level
700 confidence level
1000 reference data
1010 similarity
1100 confidence level comprehensive calculating means
1200 confidence level stored in confidence level storing means

What is claimed is:

1. A position information providing apparatus comprising:
a sensor data acquiring unit acquiring sensor data;
a feature amount calculating unit calculating a feature amount from the sensor data; and
a confidence level calculating unit calculating a confidence level using the feature amount, wherein
the sensor data is more than one sample, and
the feature amount comprises a statistical amount of more than one sample of the sensor data and characteristics of a waveform of the sensor data.

2. The apparatus according to claim 1, further comprising:
a position measuring unit measuring a position and a posture of the position information providing apparatus by autonomous navigation using the sensor data;
a guidance information generating unit generating guidance information to be presented to a user by setting a scope of search in a space around the position information providing apparatus using the position, the posture, and the confidence level and by searching geographical information within the scope of search; and
an information presentation unit presenting the guidance information to a user.

3. A position information providing system comprising:
the position information providing apparatus according to claim 2; and
a server, wherein
the server is recorded with guidance information generation data,
the position information providing apparatus further comprises a guidance information generation data acquiring unit acquiring the guidance information generation data from the server, and
the guidance information generating unit further generates the guidance information using the guidance information generation data.

4. The apparatus according to claim 1, further comprising:
a confidence level storing unit storing the confidence level; and
a confidence level comprehensive calculating unit calculating a current confidence level using the confidence level stored in the confidence level storing unit.

5. The apparatus according to claim 1, further comprising:
a sensor, wherein
the sensor generates the sensor data based on a position and a posture of the position information providing apparatus.

6. A position information providing system comprising:
the position information providing apparatus according to claim 1; and
a server, wherein
the server is recorded with the sensor data, and
the sensor data acquiring unit acquires the sensor data from the server.

7. The apparatus according to claim 1, further comprising:
a reference data storing unit storing sensor data of a particular action as reference data, wherein
the feature amount includes similarity between the sensor data acquired by the sensor data acquiring unit and the reference data in addition to or instead of a statistical amount of more than one sample of the sensor data and the characteristics of the waveform, and
the confidence level calculating unit calculates the confidence level using the similarity.

8. The apparatus according to claim 1, wherein the characteristics of the waveform comprise at least one of a number of peaks of the waveform and an average interval of time between peaks of the waveform.

9. The apparatus according to claim 1, wherein the characteristics of the waveform comprise at least one of a maximum peak value of the waveform and a minimum peak value of the waveform.

10. A position information providing method, comprising:
acquiring sensor data;
calculating a feature amount from the sensor data; and
calculating a confidence level using the feature amount, wherein
the sensor data is more than one sample, and
the feature amount comprises a statistical amount of more than one sample of the sensor data and characteristics of a waveform of the sensor data.

11. A program of a non-transitory computer readable medium, wherein a computer is caused to execute the position information providing method according to claim 10.

12. The non-transitory computer readable medium being recorded with the program according to claim 11.

* * * * *